C. L. JOHNSON.
AUTOMOBILE SPARE TIRE LOCK.
APPLICATION FILED MAR. 27, 1919.
1,346,964.
Patented July 20, 1920.
2 SHEETS—SHEET 1.
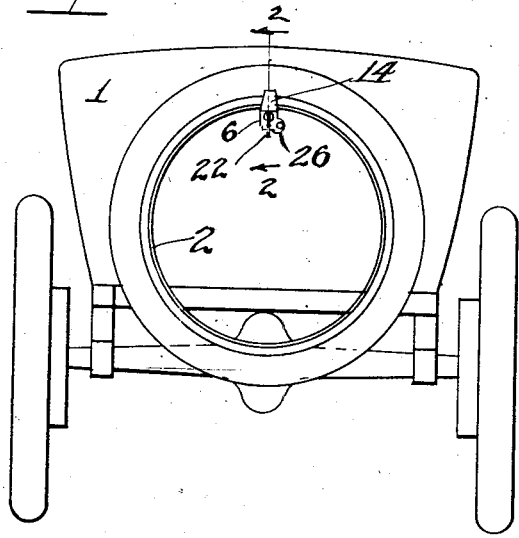
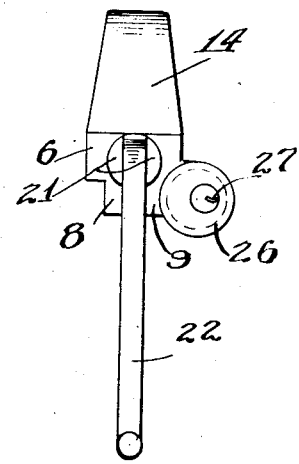
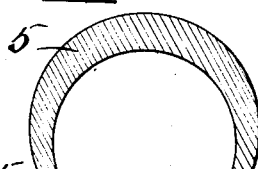
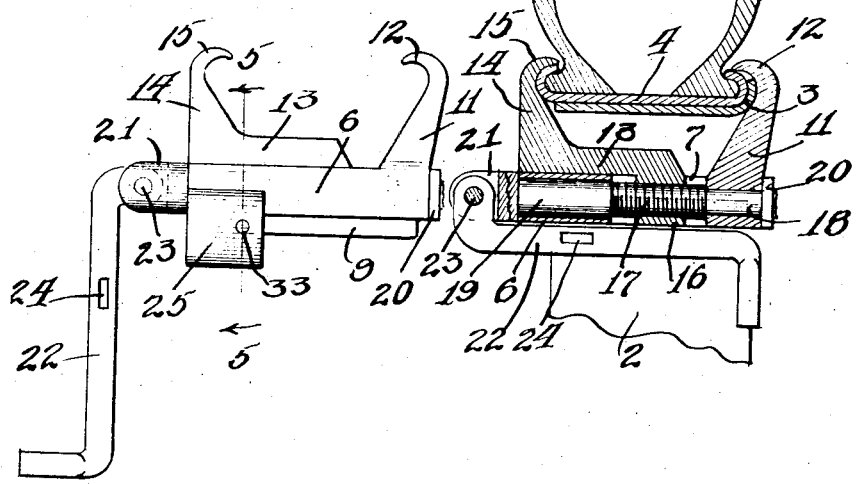
Witnesses
J. W. Angell
Charles W. Hill Jr.
Inventor
Colvin L. Johnson
by Charles W. Hill Atty.

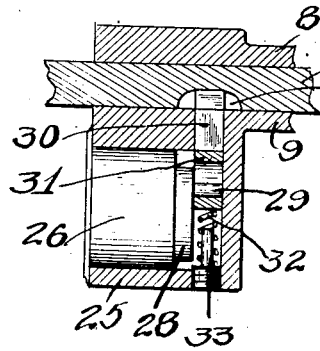
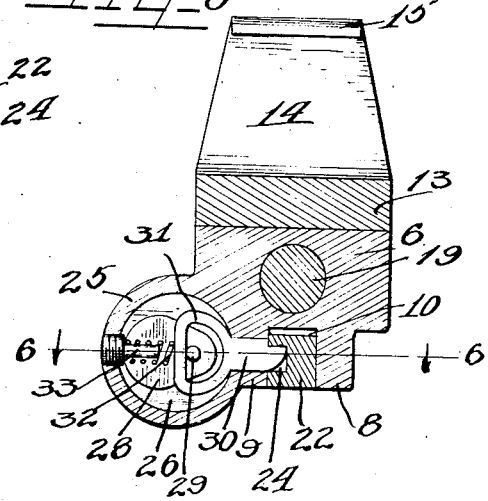
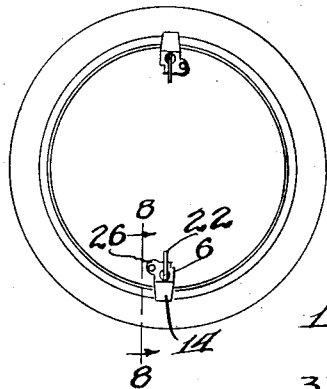
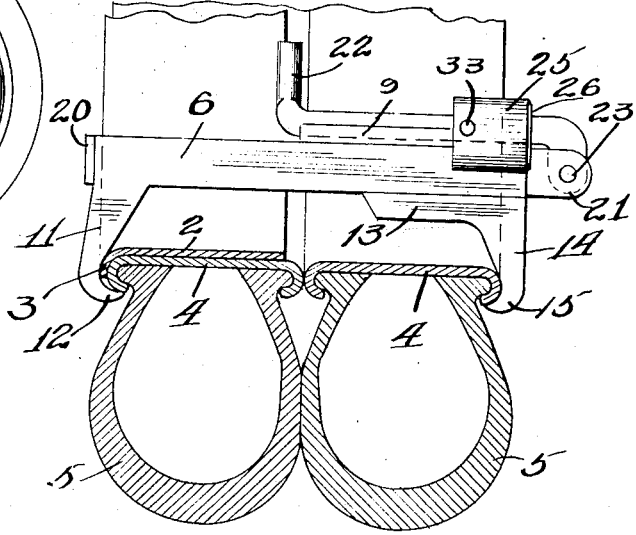

UNITED STATES PATENT OFFICE.

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

AUTOMOBILE SPARE-TIRE LOCK.

1,346,964.  Specification of Letters Patent.  Patented July 20, 1920.

Application filed March 27, 1919. Serial No. 285,418.

*To all whom it may concern:*

Be it known that I, COLVIN L. JOHNSON, a citizen of the United States, and a resident of the city of Chicago, in the county of Cook and State of Illinois, have invented certain new and useful Improvements in Automobile Spare-Tire Locks; and I do hereby declare that the following is a full, clear, and exact description of the same, reference being had to the accompanying drawings, and to the numerals of reference marked thereon, which form a part of this specification.

This invention relates more particularly to an improved type of an automobile spare tire lock adapted to be readily clamped into position to hold a spare tire locked on a tire rack against unauthorized removal.

It is an object of this invention to provide a key controlled handle operated clamping device adapted to releasably clamp a spare tire and its rim on a vehicle tire rack.

Another object of the invention is the construction of a tire lock wherein a movable clamping jaw is adapted to be operated by a screw which is actuable by means of a pivoted handle attached thereto and adapted to be automatically locked in closed position.

A further object of this invention is the construction of a spare tire lock wherein a key operated jaw lock is adapted to hold a clamp adjusting screw locked against movement.

It is a further object of the invention to provide a spare tire lock having clamping jaws adapted to be adjusted with respect to each other by means of a handle operated screw adapted to be locked against movement by a key operated pin lock.

It is an important object of the invention to provide a simple and effective spare tire lock provided with clamping jaws adapted to engage the rim of a spare tire to hold the same locked against unauthorized removal on a spare tire rack.

Other and further important objects of the invention will be apparent from the disclosures in the drawings and specification.

The invention (in a preferred form) is illustrated in the drawings and hereinafter more fully described.

On the drawings:

Figure 1 is a rear elevation of an automobile disclosing a spare tire clamped or locked on a spare tire rack by means of an improved tire lock embodying the principles of this invention.

Fig. 2 is an enlarged detail section taken on line 2—2 of Fig. 1, with parts omitted and with parts shown in elevation.

Fig. 3 is a side elevation of the tire lock showing the handle in open position.

Fig. 4 is an end view thereof.

Fig. 5 is an enlarged section taken on line 5—5 of Fig. 3, showing the handle in locked position.

Fig. 6 is a section taken on line 6—6 of Fig. 5, with parts in elevation.

Fig. 7 is an elevation of a spare tire rack having tires locked thereon by a modified form of a spare tire lock.

Fig. 8 is an enlarged detail section taken on line 8—8 of Fig. 7, and showing the tire lock in elevation.

As shown on the drawings:—The reference numeral 1, indicates an automobile having rigidly secured on the rear thereof, or in any other suitable location, a spare tire rack comprising a circular rim 2, the rear margin of which is bent or curled outwardly to afford a stop flange 3. The front margin of the rack rim 2, is straight to permit the rim 4, of a spare tire 5, to be slidably engaged on the tire rack, as shown in Fig. 2, with the inner flange of the tire rim 4, engaged against the stop flange 3, of the tire rack.

The improved tire lock comprises a block or body 6, provided with a longitudinal slot 7, in the top thereof. Integrally formed longitudinally on the bottom of the block 6, are a pair of parallel guide ribs or flange rails 8 and 9, respectively, separated to afford a groove 10. Also integrally formed on the block 6, at the rear end portion thereof, is an upwardly directed main lock or clamping jaw 11, the upper end of which is bent forwardly to form a hook 12.

The block 6, at its front end is provided with a longitudinal passage which communicates with the slot 7, and is also in alinement with a longitudinal passage of a reduced diameter formed in the rear end of said block and also communicating with said slot 7. Slidably mounted upon the block 6, is a sliding member 13, having integrally formed on the front end portion thereof, an upwardly directed secondary locking or clamping jaw 14, the upper end of which is bent inwardly to form a hook 15. The inwardly directed clamp hooks 12 and 15, are disposed opposite one another. Integrally formed on the bottom inner end of the slide member 13, is a downwardly directed lug or projection 16, provided with a threaded passage. The lug 16, is disposed within the block slot 7.

An adjusting or jaw operating member is associated with the clamping jaws and comprises a threaded shank or screw 17, having integrally formed on one end a stem 18, of reduced diameter, and on the other end a cylindrical head 19, of a diameter greater than that of the screw 17. The adjusting member has the screw 17, threaded through the threaded passage in the lug 16, with the stem 18, projecting through the rear end of the block 6. Engaged on the projecting end of the stem 18, is a washer 20, held in place against the block 6, by welding the end of said stem.

The outer projecting end of the screw head 19, is diametrically slotted to afford a pair of lugs or projections 21, between which the inner bent end of a crank or handle 22, is pivotally supported by means of a pin 23, supported by said lugs. One side of the handle 22, is provided with a locking slot or recess 24. In locking position, the handle is adapted to be swung inwardly to seat in the groove between the ribs 8 and 9, as shown in Fig. 2.

Integrally formed near the front end and at the side of the block 6, adjacent and also integral with the rib 9, is a hollow cylindrical lock casing or housing 25, having mounted therein a pin lock 26, provided with a rotatable barrel 27, having a key slot therein for receiving a key to permit rotation of the barrel. Formed on the inner end of the barrel 27, is a cam 28, on which an actuating pin 29, is eccentrically mounted. A transverse passage is provided in the rib 9, and connects the interior of the casing 25, with the groove 10, between the ribs 8 and 9. Slidably projecting through the slot in the rib 9, is a notched latch 30, having an apertured head 31, integrally formed on one end thereof and disposed within the casing chamber adjacent the lock cam 28, to permit pin 29, to project into the latch head aperture as clearly shown in Fig. 5. The latch 30, is normally held projected through the passage in the rib 9, with the notched locking end thereof projecting into the groove 10, by means of a coiled spring 32, in the casing chamber. One end of the spring 32, contacts the latch head 31, while the other end of said spring is engaged around a guide pin 33, projecting into the casing 25. The head of the guide pin 33, is threaded into a threaded opening in the casing, and has the outer end welded over to prevent removal of the pin 33.

Figs. 7 and 8, show a modified form of spare tire lock, constructed practically in the same manner as the device already described with the exception that the body or block 6, is longer so that a plurality of spare tires 5, can be locked on a tire rack.

The operation is as follows:—A spare tire 4, and its rim 5, are first engaged on the tire rack 2, with the inner flange of the tire rim 4, engaged against the stop flange 3, of the tire rack. The tire lock in open position, as shown in Fig. 3, may be adjusted by turning the handle 22, thus rotating the adjusting screw 16, causing the clamping jaw 14, to slide away from the clamping jaw 11, a sufficient distance to permit the jaws 11 and 14, to be disposed on opposite sides of the rack and tire rims 2 and 4. Thus positioned, the handle is rotated, whereby the clamping jaws 11 and 14, move toward one another until they securely clamp the tire rim and the rack rim together, as shown in Fig. 2. To hold the lock locked in its clamping position to prevent unauthorized removal of the spare tire from the tire rack, the handle 22, is moved into a position wherein the slot between the lugs 21, is vertically disposed. The pivoted handle 22, is then swung inwardly beneath the block 6, seated in the groove 10, between the ribs 8 and 9. The spring impelled latch 30, which projects into the groove 10, is depressed against the action of the spring 32, by the handle 22, as it enters the groove 10. The locking notch 24, in the handle 22, is positioned to register with the opening in the rib 9, when the handle is in closed position. This arrangement allows the spring 32, to automatically force the latch 30, outwardly with the end thereof engaged in the notch 24, of the handle thereby holding the handle locked in place against pivotal movement. The device is thus adapted to be automatically locked in clamping position.

To remove the tire lock, a suitable key is simply inserted into the key hole of the pin lock 26, and turned to rotate the lock barrel 27, and thereby cause the pin 29, to draw the latch 30, inwardly out of locking engagement with the handle 22. The handle thus released, is adapted to be swung from the position shown in Fig. 2, to the position in Fig. 3. The clamping jaws 11 and 14, are then moved apart by turning the handle 22, to rotate the jaw adjusting screw member 18—19.

The operation and application of the enlarged tire lock shown in Fig. 8, for holding a plurality of spare tires locked in position on a tire rack, is similar to that already described. If desired, two spare tire locks may be used to hold the spare tires locked on the tire rack, against unauthorized removal.

It will, of course, be understood that numerous details of construction may be varied through a wide range without departing from the principles of this invention, and I therefore do not purpose limiting the patent granted otherwise than necessitated by the prior art.

I claim as my invention:—

1. A spare tire lock embracing slidably interfitting clamping jaws, an adjusting screw engaging said jaws, means pivoted on said adjusting screw for operating the same to adjust said jaws with respect to one another, and means on one of said jaws adapted to engage and lock said pivoted means to hold the adjusting screw locked against movement.

2. A spare tire lock comprising a main clamping jaw, an auxiliary clamping jaw slidably engaged thereon, an adjusting screw rotatably mounted in said main clamping jaw and having threaded engagement with said auxiliary clamping jaw, a handle pivotally connected to said screw for rotating the same to cause adjustment of said main clamping jaw and said auxiliary clamping jaw, and means on said main clamping jaw adapted to automatically lock said handle against movement to hold the adjusting screw locked against rotation.

3. The combination with a rack, and a spare tire mounted thereon, of a tire lock comprising a pair of clamping jaws adapted to engage on opposite sides of said rack and spare tire, threaded means engaging said jaws, a member pivotally mounted on said threaded means for rotating the same to cause said jaws to clamp the spare tire on said rack, said member adapted to be swung underneath said jaws in an out of the way position, and spring controlled means on one of said jaws adapted to automatically engage said member to hold the same locked against movement.

4. A tire lock comprising a pair of slidable interfitting clamping jaws, rotatable means projecting longitudinally through said jaws, a member pivoted to said means for rotating the same to cause adjustment of said jaws, said member having a notch formed therein and adapted to be swung underneath said jaws, and a locking mechanism on one of said jaws adapted to automatically engage in said notch to hold the member and said rotatable means locked against movement.

In testimony whereof I have hereunto subscribed my name in the presence of two subscribing witnesses.

COLVIN L. JOHNSON.

Witnesses:
CHARLES W. HILLS, Jr.,
THOS. F. McGOWAN.